(12) United States Patent
Kim

(10) Patent No.: US 7,712,779 B2
(45) Date of Patent: May 11, 2010

(54) SIDE AIRBAG HAVING PIPE TYPE ADAPTIVE VENT HOLE

(75) Inventor: Eung Seo Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 205 days.

(21) Appl. No.: 11/971,638

(22) Filed: Jan. 9, 2008

(65) Prior Publication Data
US 2009/0045611 A1 Feb. 19, 2009

(30) Foreign Application Priority Data
Aug. 13, 2007 (KR) ...................... 10-2007-0081338

(51) Int. Cl.
*B60R 21/239* (2006.01)
*B60R 21/207* (2006.01)

(52) U.S. Cl. .................... 280/739; 280/730.2

(58) Field of Classification Search ............. 280/728.2, 280/730.2, 739; *B60R 21/28, 21/239*
See application file for complete search history.

(56) References Cited
U.S. PATENT DOCUMENTS 5,718,450 A * 2/1998 Hurford et al. ........... 280/730.2
6,142,517 A * 11/2000 Nakamura et al. .......... 280/739
2002/0047253 A1* 4/2002 Rasch et al. ............. 280/728.2
2004/0262898 A1* 12/2004 Bauer et al. .................. 280/739
2005/0184493 A1* 8/2005 Hofmann et al. ......... 280/730.2
2007/0057492 A1* 3/2007 Feller et al. .............. 280/730.2
2008/0023945 A1* 1/2008 Zauritz et al. ................ 280/729

FOREIGN PATENT DOCUMENTS

JP 7-323806 A * 12/1995
JP 2001-277991 * 10/2001

* cited by examiner

*Primary Examiner*—Ruth Ilan
(74) *Attorney, Agent, or Firm*—Morgan, Lewis & Bockius LLP

(57) ABSTRACT

Disclosed is a side airbag, which controls the pressure of the airbag by controlling the outflow of gas in such a manner as to block or open a vent hole depending on the physical size of the occupant. The side airbag includes a side airbag cushion disposed to at least one side of a seat and having at least a vent hole formed at an upper part and at least a gas control member disposed to block or open the vent hole of the side airbag, for allowing or preventing gas to flow out through the vent hole by the inner pressure of the gas upon deployment of the side airbag cushion. Thus, injury to the occupant can be reduced.

9 Claims, 4 Drawing Sheets ical size from external impacts in a collision of the vehicle. The conventional side airbag apparatus also has a limit in that the airbag cushion is formed in constant pressure regardless of physical

SIDE AIRBAG HAVING PIPE TYPE ADAPTIVE VENT HOLE

CROSS-REFERENCE TO RELATED APPLICATION

This application claims priority to and the benefit of Korean Patent Application No. 10-2007-0081338, filed in the Korean Intellectual Property Office on Aug. 13, 2007, the entire contents of which are incorporated herein by reference.

BACKGROUND OF THE INVENTION

1. Field of the Invention

The present invention relates to a side air bag having a pipe type adaptive gas control member, which is configured to protect an occupant having a large physical size by providing a high pressure of airbag cushion and to protect an occupant having a small physical size by providing a low pressure of airbag cushion with controlling the outflow of gas in such a manner as to block or open at least a vent hole corresponding to the physical size and position of occupant's shoulder portion.

2. Discussion of the Related Art

Generally, a vehicle is provided with various types of airbag apparatuses for protecting passengers from external impacts in a collision of the vehicle. Among them, a side airbag apparatus is mounted within the seat of the vehicle, and serves to protect the head, shoulder, chest, and hip regions that correspond to the side portions of the occupant's body from external impacts in a collision of the vehicle.

FIG. 1 is a cross sectional view showing one example of a side airbag apparatus according to the conventional art.

The conventional side airbag apparatus, as shown in FIG. 1, includes an airbag body 6, an inflator 4 and a diffuser 5. The airbag body 6 is divided into a head chamber 3 and a body 1 by a dividing wall 2. When the vehicle collides and gas is supplied, the body 1 is filled with the gas from the inflator 4 at first. After then if the body 1 is hit by occupant, the head chamber 3 starts to inflate through holes 2' formed at the dividing wall 2, thereby protecting the head region of the occupant.

However, the head chamber 3 of the aforementioned airbag is constantly inflated to a predetermined size regardless of the occupant's physical size. This leads to a problem that the head chamber 3 inflated with a high pressure gives a blow back to the head portion of even an occupant having a small physical size, like a child, to thus cause injury to the occupant.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to solve the above-said problems, and has for its object to provide a side air bag having a pipe type adaptive gas control member, which is applicable to any position of each region due to a simple structure, enables to control the opening and closing of an adaptive gas control member by a contact between a pipe type adaptive gas control member of an airbag cushion and an occupant, and is configured to protect an occupant having a large physical size by providing a high pressure of airbag cushion and to protect an occupant having a small physical size by providing a low pressure of airbag cushion by controlling adaptively the inner pressure of the airbag cushion, depending on the physical size of the occupant.

To achieve the foregoing object, a side airbag having a pipe type adaptive gas control member according to an embodiment of the present invention comprises: a side airbag cushion disposed to one side of a seat and having at least a vent hole formed at a portion of an upper part of the side airbag; and a gas control member disposed on the vent hole, for controlling the inner pressure of the side airbag cushion so that the vent hole is blocked or opened, depending on the occupant's physical size.

In one preferred embodiment, the present invention provides the vent hole formed at a position corresponding to the shoulder portion of an occupant having a large physical size to provide high pressure to the airbag cushion and above the shoulder portion of an occupant having a small physical size to reduce internal pressure of the airbag cushion and thus reduce injury in car collision.

In another preferred embodiment, the present invention provides the gas control member that includes an upper fixing portion fixed to an upper part of the vent hole of the airbag cushion, a gas guiding portion for guiding gas, and a lower fixing portion fixed to a lower part of the vent hole of the airbag cushion.

In a further preferred embodiment, the present invention provides the upper fixing portion and the lower fixing portion that are fixed to an inner surface of the airbag cushion so as to be tightly adhered thereto.

In a preferred embodiment, the present invention provides the gas guiding portion that includes a shielding portion that prevents gas from being discharged toward an occupant so that the occupant may not be injured, a front guiding portion projected forward from the shielding portion to guide the gas forward, and a rear guiding portion projected rearward from the shielding portion to guide the gas rearward.

In a preferred embodiment, the present invention provides the gas control member that is formed of an easily foldable/unfoldable fabric.

In a further preferred embodiment, the present invention provides the gas control member that is fixed to the airbag cushion by a sewing method.

In a further preferred embodiment the present invention provides the gas control member formed in a cross shape.

In another further preferred embodiment the present invention provides the gas control member that has a folding portion that is folded and unfolded.

In another further preferred embodiment the present invention provides the gas control member that has a plurality of horizontal folding lines.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
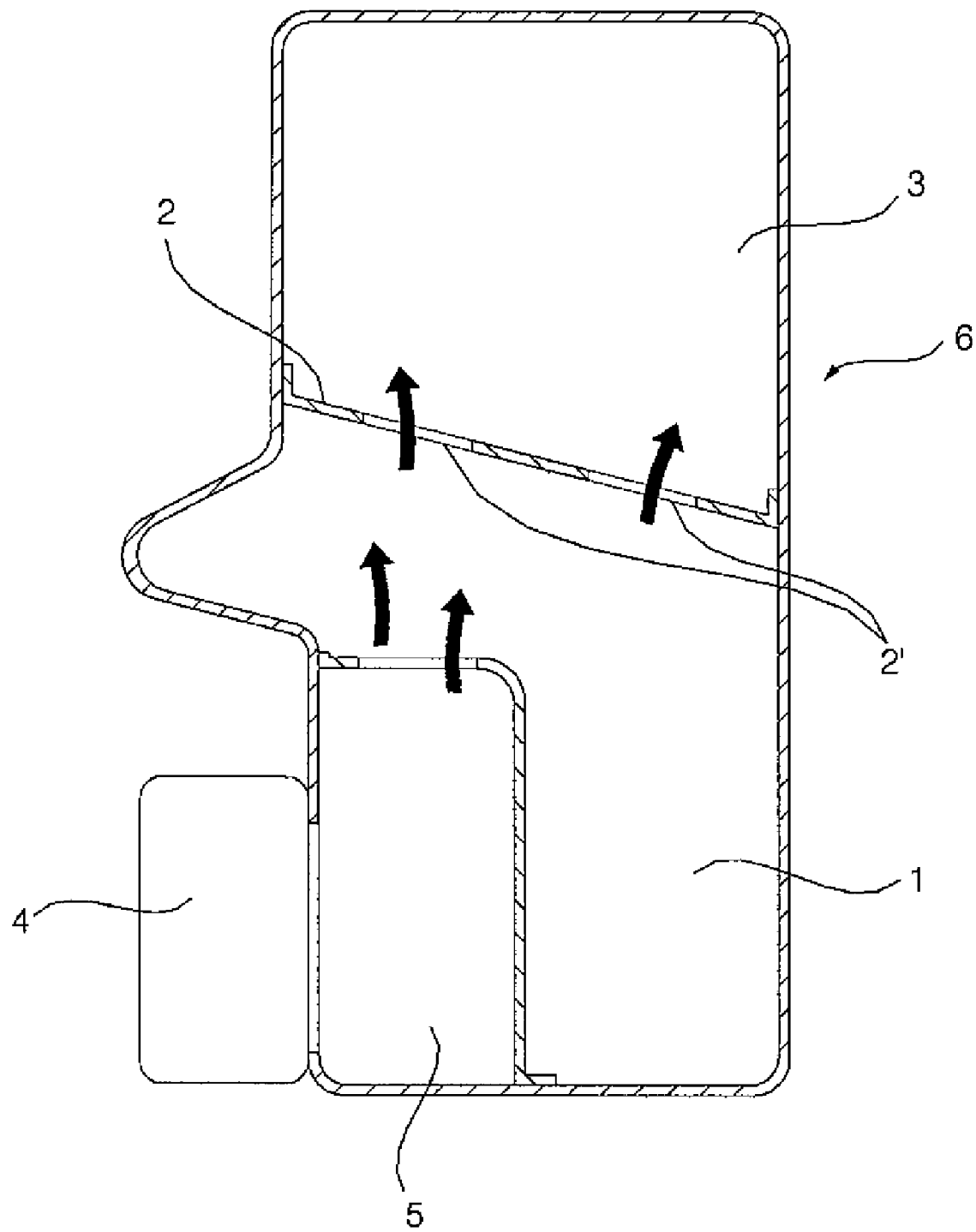
FIG. 1 is a cross sectional view showing one example of a side airbag apparatus according to the conventional art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF THE INVENTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, a preferred embodiment of a side airbag having a pipe type adaptive gas control member according to the present invention will be described with reference to the accompanying drawings.

Figure 2:
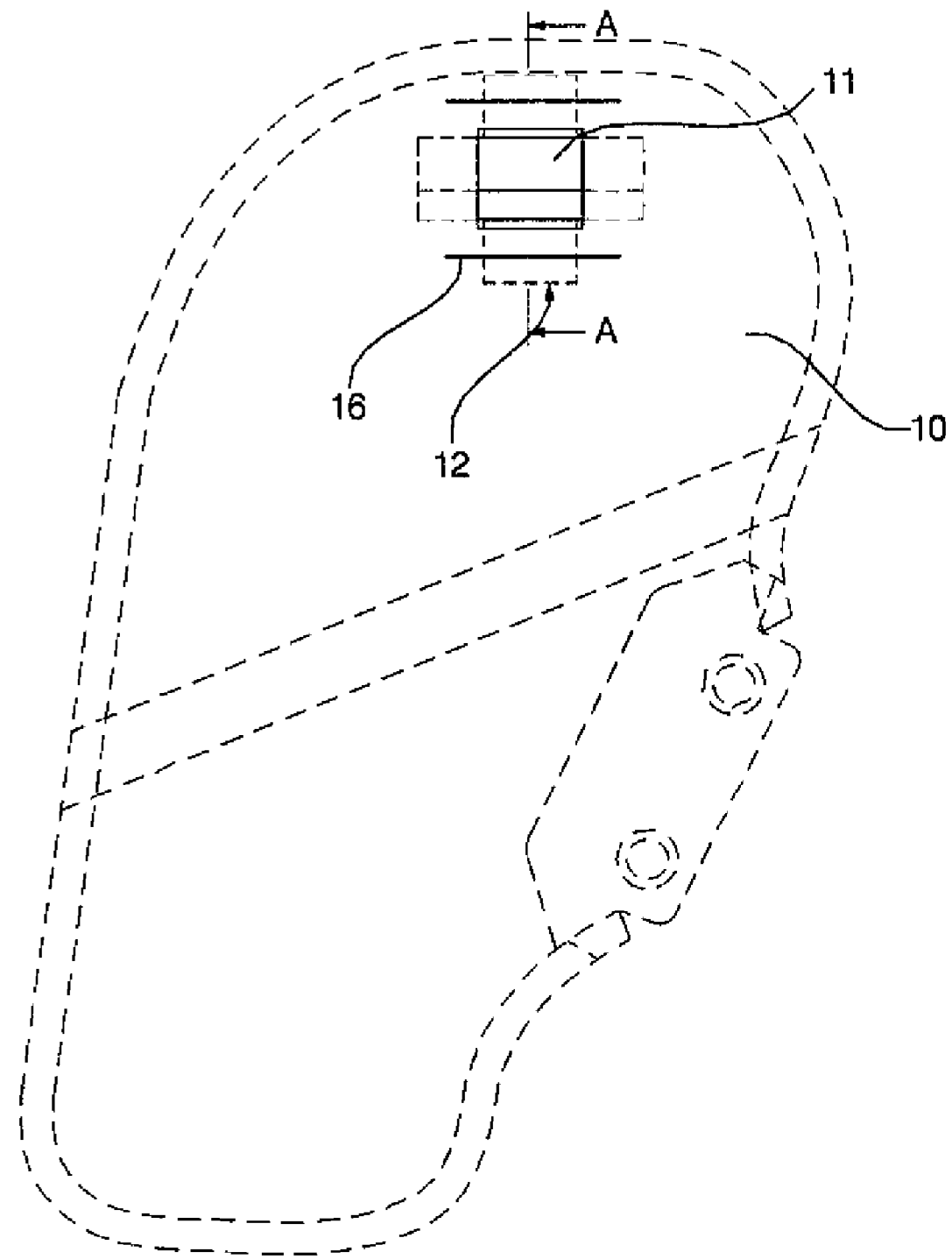
FIG. 2 is a schematic view showing a side airbag according to an exemplary embodiment of the present invention.
Figure 3A:
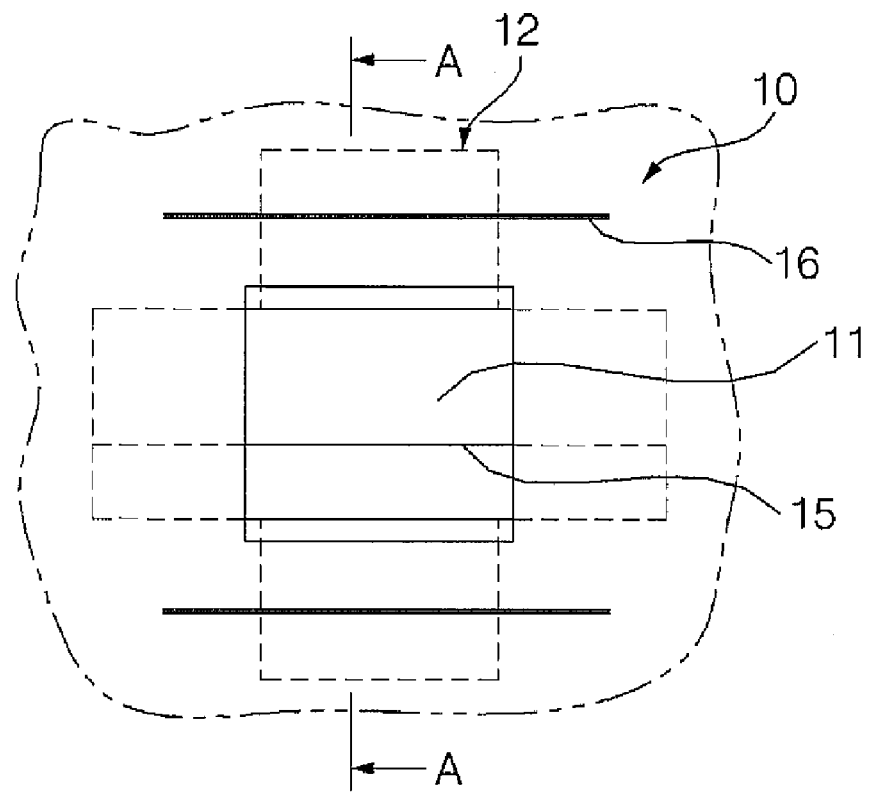
FIG. 3(a) is a front view showing a gas control member prior to gas deployment according to an exemplary embodiment of the present invention.
Figure 3B:
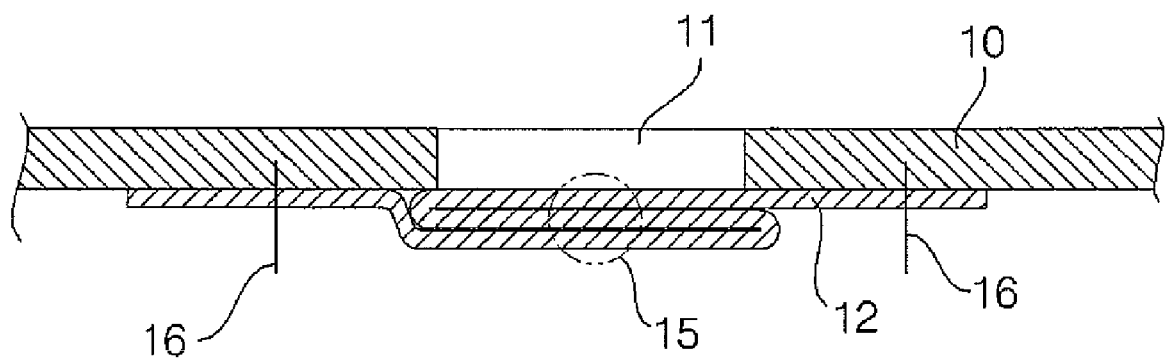
FIG. 3(b) is a cutaway cross-sectional view showing the gas control member taken along line A-A prior to gas deployment according to an exemplary embodiment of the present invention.
Figure 4A:
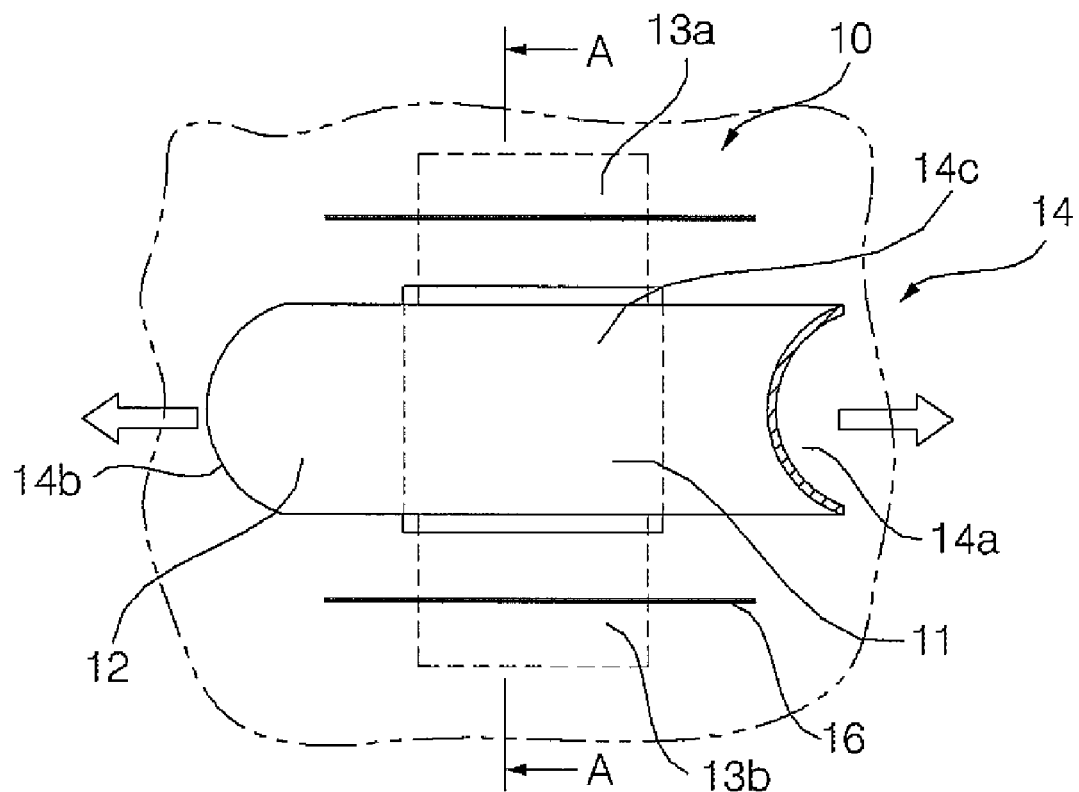
FIG. 4(a) is a front view showing the gas control member after gas deployment according to an exemplary embodiment of the present invention.
Figure 4B:
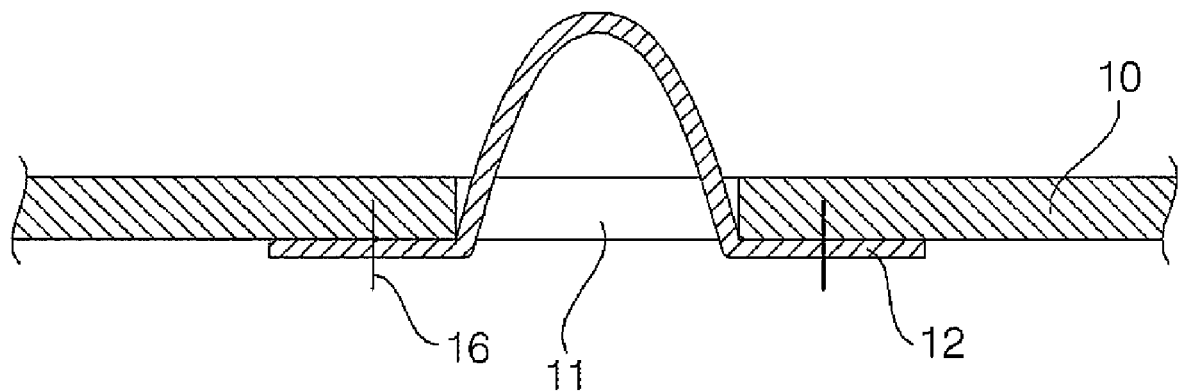
FIG. 4(b) is a cutaway cross sectional view showing the gas control member taken along line A-A after gas deployment according to an exemplary embodiment of the present invention.

FIG. 2 is a schematic view showing a side airbag according to an exemplary embodiment of the present invention. FIG. 3(a) is a front view showing a pipe type adaptive gas control member prior to gas deployment according to an exemplary embodiment of the present invention. FIG. 3(b) is a cutaway cross sectional view showing the pipe type adaptive gas control member taken along line A-A prior to gas deployment according to an exemplary embodiment of the present invention. FIG. 4(a) is a front view showing the pipe type adaptive gas control member after gas deployment according to an exemplary embodiment of the present invention. FIG. 4(b) is a cutaway cross sectional view showing the pipe type adaptive gas control member taken along line A-A after gas deployment according to an exemplary embodiment of the present invention.

As shown in FIGS. 2 and 4(a), the side airbag having a pipe type adaptive gas control member according to an exemplary embodiment of the present invention includes an airbag cushion 10 having at least a vent hole 11 substantially at an upper part of the airbag cushion 10. The pipe type adaptive gas control member 12 may be cross-shaped, as shown in FIG. 3. The upper and lower parts of gas control member 12 are sewn and fixed to the inner surface of the airbag cushion 10 according to the size of the vent hole 11 to shield the vent hole 11. The reference numeral 16 is an illustration of a sewing line which shows that the gas control member 12 is fixed to the inside of the airbag cushion 10 by a sewing method.

The vent hole 11 controls the inner pressure of the side airbag cushion 10 by opening and closing the vent hole 11 with contact of some part of a human body according to the physical size of an occupant. Therefore the size of vent hole 11 may vary depending on physical size of an occupant.

In a preferred embodiment of the present invention, the shape of the vent hole 11 is square or rectangular, but not limited thereto and any other shape may be employed and included as long as they carry out the function of discharging parts of the gas filled in the airbag cushion 10 to the outside.

In one exemplary embodiment, the vent hole 11 having a rectangular shape is preferably formed on a portion of the airbag cushion 10 at a position where the shoulder portion of an occupant having a relatively large physical size is in contact with the vent hole 11 by taking into account a completely inflated state of the airbag cushion 10.

Meanwhile, the gas control member 12 may be fixed in a folded state, by a sewing method, onto the inner surface of the airbag cushion 10 having the vent hole 11 formed thereon, i.e., the upper fixing portion 13a and the lower fixing portion 13b may sewn as shown in FIG. 3(b) and FIG. 4(a).

In an exemplary embodiment, the gas control member 12 does not come out as the shoulder portion of an occupant having a large physical size comes in contact with the portion of the gas control member 12 to block the vent hole 11 upon deployment of the airbag cushion. At this time, since the vent hole 11 is blocked by the gas control member 12, the internal pressure of the airbag cushion 10 is kept in a high state enough to cope with a collision of the vehicle with high pressure of the airbag cushion 10.

On the other hand, in case of an occupant having a small physical size, because the shoulder portion of the occupant cannot reach the gas control member 12 to block the vent hole 11, the gas control member 12 cannot sustain the internal pressure of the airbag cushion 10 if inflated. Hence the gas control member 12 becomes unfolded outward by the increased internal pressure of the airbag cushion 10 and comes out through the vent hole 11 as shown in FIG. 4. Accordingly the internal gas is ejected through the vent hole 11 via the unfolded gas control member 12, thereby reducing the internal pressure of the airbag cushion 10. The reduced internal pressure prevents or decreases the injury of the occupant having a small physical size in car collision.

As explained above, in one embodiment of the present invention, in the event of a collision of a vehicle, if the physical size of an occupant in the vehicle is large, the airbag cushion 10 protects the occupant in a high pressure state against car collision by taking advantages of the high pressure kept in the airbag cushion 10. If the physical size of an occupant is small, the airbag cushion 10 protects the occupant in a low pressure state by ejecting the gas with the gas control member. Thus, the efficiency of occupant protection is improved.

The shape, structure and function of the gas control member 12 will be described in more detail.

First of all, as shown in FIGS. 3(a) and 4(a), the gas control member 12 includes an upper fixing portion 13a fixed to an upper part of the vent hole 11 of the airbag cushion 10, a gas guiding portion 14, and a lower fixing portion 13b fixed to a lower part of the vent hole 11 of the airbag cushion 10. The upper fixing portion 13a and the lower fixing portion 13 b are fixed to an inner surface of the airbag cushion 10 as shown in FIG. 4(*b*) so as to be tightly adhered thereto.

The gas guiding portion 14 includes a shielding portion 14*c* which comes out by the internal pressure of the airbag cushion 10 upon deployment of the airbag cushion 10 and prevents gas from being discharge toward an occupant directly so that the occupant may not be injured, a front guiding portion 14*a* projected forward from the shielding portion 14*c* to guide gas forward, and a rear guiding portion 14*b* projected rearward from the shielding portion 14*c* to guide gas rearward.

In an embodiment, a front guiding portion 14*a* and a rear guiding portion 14*b* may be folded inwards onto the shielding portion 14*c* prior to deployment of the airbag cushion 10. However, upon deployment of the airbag cushion 10, the front guiding portion 14*a* and the rear guiding portion 14*b* may be unfolded outwards from the shielding portion 14*c* as shown in FIG. 4.

Herein, for the convenience of explanation, the term "front guiding portion" 14*a* and the term "rear guiding portion" 14*b* are employed and used to refer to one side of the shielding portion 14*c* and the other side thereof, respectively. But, any other terms may be included in the claims of the present invention as long as the gas control member 12 of a deployed state is entirely tightly adhered to the outside of the airbag cushion 10 and is in the shape of a pipe which is opened at both sides thereof.

The gas control member 12 of this type may be entirely formed in a cross shape as shown in FIG. 3(*a*). The middle part, i.e., shielding portion 14*c* of the gas guiding portion 14 is fixed in a folded state to the inner surface of the airbag cushion 10 before deployment of the airbag cushion 10, to thus form a folding portion 15 as shown in FIG. 3(*a*). Such a folding portion 15 may have a plurality of horizontal folding lines formed thereon. The folding portion 15 fixed to the inner surface of the airbag cushion 10 increases the sealing effect of the gas control member 12 to prevent or restrain the gas from leaking out.

Further, the gas control member 12 is preferably made of an easily foldable/unfoldable fabric as described above.

Hereinafter, the operational procedure of the side airbag having a pipe type adaptive gas control member according to the present invention will be described below.

Firstly, in the event of a collision of the vehicle, the airbag cushion 10 is deployed and comes into contact with the sides of an occupant.

At this time, the gas control member 12 may or may not come out of the airbag cushion 10 according to the physical size of the occupant in the vehicle in the present invention.

In the case of an occupant having a large physical size, the vent hole 11 is blocked when the shoulder portion of the occupant contacts with the vent hole 11 and thus the gas control member 12 cannot be deployed. Therefore the front guiding portion 14*a*, the rear guiding portion 14*b*, and the shielding portion 14*c* of the gas control member 12 are caught by the airbag cushion 10 so that the gas control member 12 is not unfolded, thereby providing the internal pressure of the airbag cushion 10 in a high pressure state. The high pressure of the airbag cushion 10 protects an occupant having a large physical size more effectively than the low pressure.

Meanwhile, even in case of an occupant having a large physical size, the vent hole 11 of the gas control member 12 is not always blocked. In other words, even in case of an occupant having a large physical size, the inside of the airbag cushion 10 becomes a high pressure state by being filled with gas before the shoulder portion of the occupant is contacted with the vent hole 11, thereby making the gas control member 12 come out of the airbag cushion 10 if the pressure is so increased that it surmounts the sealing effect that shielding portion 14*c* provides. At this time, the vent hole 11 is firstly opened. Even in this case, the gas control member 12, which is formed of a fabric, is easily folded if the shoulder portion of the occupant having a large physical size contacts with the vent hole 11 and thus block or narrow the vent hole 11, thereby keeping the inner pressure of the airbag cushion 10 in a high pressure state.

On the other hand, in case of an occupant having a small physical size, the gas control member 12 comes out of the vent hole 11 if the inner pressure of the airbag cushion 10 is so increased that it surmounts the sealing effect that shielding portion 14*c* provides. However since the shoulder portion of the small occupant could not block the vent hole 11 because the vent hole 11 is positioned above the shoulder portion of an occupant having a small physical size. Therefore the increased pressure in the airbag cushion 10 pushes the gas guiding portion 14 outwards though the vent hole 11 as shown in FIG. 4(*b*). The gas filled inside the airbag cushion 10 thus is discharged to the outside along the front guiding portion 14*a* and rear guiding portion 14*b* of the gas control member 12 deployed in a pipe type, thereby lowering the internal pressure of the airbag cushion 10.

The decreased internal pressure of the airbag cushion 10 may reduce the injury of occupant having a small physical size in the car collision.

In conclusion, the side airbag having a pipe type adaptive gas control member according to the present invention can protect an occupant having a large physical size by providing the airbag cushion in a high pressure state and an occupant having a small physical size by providing the airbag cushion in a low pressure state, thereby promoting the safety of the occupant more efficiently.

The side airbag having a pipe type adaptive gas control member according to the present invention has the following effects.

As the vent hole is opened and closed according to the physical size of an occupant, the internal pressure of the side airbag can be controlled, thereby reducing injury to the occupant, and the side airbag is applicable to any position of each region due to a simple structure and makes it easier to adjust the size of the vent hole.

Additionally, it is possible to prevent gas from flowing out without failure by the simple operation of contacting with the shoulder portion of the occupant because the side airbag is formed of a fabric, and the ejection direction of the gas does not affect the occupant.

Although the preferred embodiment of the side airbag having a pipe type adaptive gas control member according to the present invention has been described with reference to the illustrated drawings, the invention is not limited to the embodiments and drawings, and it is apparent that various modifications and embodiments of the invention may be made by those skilled in the art without departing from the spirit and scope of the invention Accordingly, the scope of the invention should be determined by the claims that follow.

What is claimed is:

1. A side airbag having a pipe adaptive gas control member, comprising:
   a side airbag cushion disposed to at least one side of a seat;
   at least a vent hole formed substantially at an upper part of the side airbag; and
   the gas control member disposed on the vent hole, for controlling inner pressure of the side airbag cushion to block or open the vent hole,
   wherein the gas control member includes:

an upper fixing portion fixed to an upper part of the vent hole of the airbag cushion;

a gas guiding portion for guiding gas; and a lower fixing portion fixed to a lower part of the vent hole of the airbag cushion, wherein the gas guiding portion includes:

a shielding portion for preventing gas from being discharged toward an occupant so that the occupant may not be injured, a front guiding portion projected forward from the shielding portion; and a rear guiding portion projected rearward from the shielding portion, and wherein the front guiding portion and the rear guiding portion are folded inwards onto the shielding portion in a folding state but the front guiding portion and the rear guiding portion are unfolded outwards from the shielding portion in an unfolding state.

2. The side airbag of claim 1, wherein the gas control member is formed of a foldable and unfoldable fabric.

3. The side airbag of claim 1, wherein the gas control member is fixed to the airbag cushion by a sewing method.

4. The side airbag of claim 1, wherein the gas control member has a folding portion that is folded and unfolded.

5. The side airbag of claim 4, wherein the gas control member has a plurality of horizontal folding lines.

6. The side airbag of claim 1, wherein the vent hole is formed substantially at a position corresponding to a shoulder portion of an occupant having a large physical size and above a shoulder portion of an occupant having a small physical size to control the internal pressure and reduce injury.

7. The side airbag of claim 6, wherein the vent hole is blocked or opened by the shoulder portion of the occupant having the large physical size but not by the shoulder portion of the occupant having a small physical size to control the internal pressure and reduce injury.

8. The side airbag of claim 1, wherein the upper fixing portion is fixed substantially near to an upper portion of the vent hole and the lower fixing portion is fixed substantially near to an lower portion of the vent hole wherein the upper fixing portion and the lower fixing portion are fixed to an inner surface of the airbag cushion so as to be tightly adhered thereto.

9. A side airbag having a pipe adaptive gas control member, comprising:

a side airbag cushion disposed to at least one side of a seat;

at least a vent hole formed substantially at an upper part of the side airbag; and the gas control member disposed on the vent hole, for controlling inner pressure of the side airbag cushion to block or open the vent hole, wherein the gas control member is formed in a cross shape.

* * * * *